United States Patent [19]

Mitchell

[11] 3,949,092

[45] Apr. 6, 1976

[54] HOP EXTRACT CONTAINING POTASSIUM ISOHUMULATE

[75] Inventor: William Mitchell, Hatfield, England

[73] Assignee: Bush Boake Allen Limited, London, United Kingdom

[22] Filed: July 3, 1974

[21] Appl. No.: 485,536

Related U.S. Application Data

[60] Continuation of Ser. No. 318,699, Dec. 26, 1972, abandoned, which is a continuation of Ser. No. 129,608, March 30, 1971, abandoned, which is a division of Ser. No. 743,586, July 10, 1968, Pat. No. 3,607,300, which is a continuation-in-part of Ser. No. 594,980, Nov. 17, 1966, abandoned.

[30] Foreign Application Priority Data

Aug. 8, 1967    United Kingdom............... 36469/67
Nov. 17, 1965   United Kingdom............... 48866/65

[52] U.S. Cl. .................. 426/16; 426/592; 426/600; 426/651
[51] Int. Cl.² .. C12C 9/02; C12C 11/04; C12C 3/00
[58] Field of Search ......... 426/223, 349, 29, 16, 11, 426/192, 592, 600, 651

[56] References Cited

UNITED STATES PATENTS

| | | | |
|---|---|---|---|
| 3,354,219 | 11/1967 | Rigby | 426/349 X |
| 3,361,569 | 1/1968 | Malick | 426/16 |
| 3,364,265 | 1/1968 | Klingel et al. | 426/11 X |
| 3,607,300 | 9/1971 | Mitchell | 426/349 |
| 3,798,332 | 3/1974 | Westerman et al. | 426/29 |

*Primary Examiner*—David M. Naff
*Attorney, Agent, or Firm*—Herbert H. Goodman

[57]    ABSTRACT

The present invention provides a flavoring agent suitable for addition to fermented beer. The flavoring agent is an aqueous solution of water and potassium isohumulates substantially free from lupulones and fixed essential oils of hops. The invention also provides a method for flavoring beer by adding a hop extract consisting essentially of an aqueous solution containing between about 40% and 60% by weight of potassium isohumulates which are substantially free from lupulones and fixed and essential oils of hops.

4 Claims, No Drawings

HOP EXTRACT CONTAINING POTASSIUM ISOHUMULATE

This application is a continuation application of Ser. No. 318,699 filed Dec. 26, 1972 and now abandoned; which in turn was a continuation application of Ser. No. 129,608 filed Mar. 30, 1971 and now abandoned; which in turn was a divisional application of Ser. No. 743,586 filed July 10, 1968 (now U.S. Pat. No. 3,607,300, issued Sept. 21, 1971); which in turn was a continuation-in-part application of Ser. No. 594,980 filed Nov. 17, 1966, now abandoned.

The present invention relates to the manufacture of hop extracts and to the flavouring of beer therewith.

Hops contain resins, oils, waxes, water soluble material such as tannins, proteins and pectins, and a matrix of cellulosic material. The resins consist of the "soft resins", which include the humulones and lupulones, and the "hard resins". The oils consist of the volatile essential oil and the relatively involatile fixed oil.

The term "humulone" is used generically herein to include the α-acids such as are present in hops, e.g. humulone, cohumulone, adhumulone and posthumulones. The water soluble salts of the afore-mentioned humulones are referred to herein as "humulates". "Isohumulones" includes the compounds isohumulone, isocohumulone, isoadhumulone and isoposthumulones which may be prepared by isomerizing the corresponding humulones. The term "lupulones" as used herein includes the weakly acidic β-acids of hops. "Fixed oil" refers to the relatively involatile oil contained in the hop seeds which is not removed by the boiling water in conventional brewing operations. "Essential oil" refers to the relatively volatile oils which contribute to the aroma of hops.

In the traditional brewing process hops are boiled with wort prior to the fermentation step. In the course of this boiling, part of the soft resins (comprising humulones) is isomerised into a water soluble form and dissolves in the wort. It has long been realised that it is this water soluble isomerised material, comprising isohumulones, which is principally responsible for the bitter flavour of beer. The traditional process has many disadvantages; e.g. it is necessary to store a large bulk of hops which are subject to slow deterioration; it is difficult to obtain a consistent degree of bitterness; and, in particular, only a small proportion of the humulones present in the hops appears in the wort as isohumulones after boiling, so that much of the potential bitterness is wasted.

A number of attempts have been made to extract the essential flavouring ingredients from hops using organic solvents. One disadvantage of such extracts is that in addition to the humulones and other desirable hop ingredients the organic solvent tends to remove undesirable hop ingredients which can give rise to unpleasant flavours. Moreover, the extracted humulones upon addition to boiling wort are only partially utilized.

In order to prepare isohumulones efficiently, it has been proposed to contact the humulones with hot alkali. The principal disadvantage of this technique is that when hops or hop extracts are contacted with hot alkali, certain other ingredients apart from the humulones undergo ingradation giving rise to disagreeable flavours.

Various methods have been proposed for separating the humulones from the other hop extractive in order to prepare pure isohumulones, but these methods have generally been too costly for commercial application. Moreover, pure isohumulones do not impart the full flavour of traditional beer, and their exclusive use may result in wastage of other flavour ingredients present in the hops.

In U.S. Pat. No. 3,607,298 are described methods by which undesirable flavouring ingredients, such as fixed oils, can be eliminated from the hop extract by fractionating the extract in aqueous methanol; and methods by which the humulones may be isomerised with hot alkali, without generating the usual off-flavours, by dissolving the extract in a water immiscible solvent, partitioning with aqueous alkali isomerising and recovering isohumulones from the aqueous phase. However, it has been found that further losses of isohumulones occur when isomerised extracts prepared in this way are added to beer. This is due to the entrainment of isohumulones by water insoluble resinous material such as lupulones which are co-extracted by the alkali and which precipitate in the beer.

We have discovered that it is possible to prepare an extract of hops comprising a high proportion of isohumulones substantially free of lupulones, fixed oils and unpleasant alkali degraded material, if a solution of hop extract in a water-immiscible solvent which dissolves humulate salts less readily than does water, is contacted with aqueous alkali at a pH sufficient to transfer the α-acids into the aqueous phase as humulate salts but not sufficient to transfer the lupulones into the aqueous phase as lupulate salts. We have further discovered that the other desirable hop ingredients, including essential oils and lupulones may be conveniently used provided that they are separated from the humulones prior to the isomerisation thereof, freed from any fixed oils and added to the wort as a "kettle adjunct" prior to the isohumulones.

Prior methods of preparing isomerised hop extracts have generally required the boiling of a dilute alkaline solution of humulates whereby the solution is evaporated to form a concentrated solution which is finally dried under reduced pressure to an anhydrous powder. We have found that the extensive boiling required by this technique causes some degradation of humulone into less useful substances and is moreover very expensive in terms of heat energy.

We have discovered that the product is improved and considerable savings in production costs achieved if the humulones are recovered from the dilute solution by precipitation with an alkaline earth metal or by solvent extraction. We have further discovered that soft extracts containing 10 to 25% by weight of water are more convenient to handle than anhydrous extracts (which may be unpleasant to workers handling them) and are, moreover, easier to dissolve in water before addition to wort or beer.

Hitherto, it has been customary to employ sodium alkalis for separating and/or isomerising humulones, although it has been suggested that other alkalis might also be employed. In practice, we have found that a somewhat superior separation of humulones maybe obtained using the sodium alkalis. Surprisingly, we have now discovered that the potassium salts of the isohumulones are superior to the sodium salts as bittering agents for beer and like beverages.

An object of our invention is therefore to provide a convenient and economical process for isolating isomerised humulones and other desirable hop resins in high yield from hops, and substantially free from hop ingredients which give rise to off flavours. A further object of our invention is to provide improved bittering agents which are readily soluble in wort or beer. A further object of our invention is to provide means for the bittering of beer which provide a consistent and natural flavour without wastage of the bitter ingredients of the hop.

The invention may be summarized as residing in methods for the preparation and use of isomerised bittering agents for beer comprising the following steps:

1. The separation of humulones from humulone-containing hop material into a dilute aqueous solution as alkali metal humulate:

Desirably, the humulones are separated from substantially all the oils, both fixed and essential, and from any hop wax. Preferably, the humulones are also separated from at least the more water insoluble of the soft resins, including at least most of the lupulones. The separation is conveniently brought about by obtaining a solution of a solvent extract of hops in a water immiscible, relatively non-polar solvent and contacting it with an aqueous alkaline solution containing alkali metal ions. The preferred alkaline solutions are of salts which have a buffering action and most particularly carbonates. It may sometimes be desirable to include a minor proportion of water miscible organic solvent, e.g. methanol with the alkali, but this is not essential. The best alkali metal ion at this stage is sodium; but potassium may also be employed. If potassium is employed it is preferred to wash the aqueous extract with a water-immiscible relatively non-polar solvent e.g. petroleum or preferably benzene.

2. The concentration of the dilute solution of humulate salts:

This is preferably effected by transferring the humulones from the dilute solution into a smaller bulk of a different solvent, preferably without substantial boiling or evaporation of the dilute solution, and most desirably while maintaining the solutions at ambient temperature. E.g. the humulones may be precipitated as a water insoluble salt of a polyvalent cation, redissolved in a second solvent, and converted back into an alkali metal humulate by treatment with an alkali metal salt of an anion which precipitates the polyvalent cation. Alternatively, the dilute solution of humulate may be contacted with a polar, water-immiscible solvent which dissolves humulates more readily than water, into which the humulates pass. Preferably, if the humulates are not already present as a potassium salt, they are converted into a potassium salt at this stage, e.g. by ion exchange resin; by neutralising a solution in a water-immiscible solvent with dilute acid, neutralisation and extracting the water-immiscible solution with an aqueous alkaline solution containing potassium ions; or by contacting an organic solution of the humulate of a polyvalent metal cation with, for example, potassium carbonate.

3. Isomerisation:

This may be effected by various means but preferably by boiling an aqueous solution of sodium or potassium humulate, preferably potassium humulate. The isomerised alkaline aqueous solution may then be washed with petrol if desired. If the isohumulone is not present as a potassium salt at this stage it may be converted into one, using, for example, one of the methods described under (2) above. The isomerisation may be carried out in the dilute solution prior to the concentration by (2) above, but it is preferred to isomerise a concentrated solution of humulates in order to reduce heating costs.

4. Preparation of a bittering extract:

The isohumulate may be used as the aqueous solution, but preferably it is evaporated to form a soft alkaline extract containing 10 – 25% water. Drying to a solid and powdering is possible but very much less preferred. If desired the isohumulate may be blended with emulsifying salts, diluents and/or water soluble salts of other hop resins, e.g. alkali metal hulupates, and optionally, hop essential oils.

5. Addition of the bittering extract to beer:

This may occur either before or after fermentation. Preferably, however, the bittering extract is added as an aqueous solution to fermented beer. Conveniently, the beer may already have been partially flavoured by boiling with hops or by addition of a kettle adjunct comprising, for example, hop resins, such as lupulones or hulupones, and hop essential oils.

Our invention provides a method of preparing an isohumulone containing hop extract which comprises contacting a solution of a solvent extract of hops in a water immiscible solvent with an aqueous alkali at a pH sufficient to transfer at least a major part of the humulones into the aqueous phase to form a dilute aqueous solution of humulates, while leaving at least a major part of the lupulones in the non-aqueous phase, separating the aqueous and non-aqueous phases, heating the humulates in solution to effect isomerisation thereof and recovering the humulones from the dilute aqueous phase, at the latest after the isomerisation, by precipitation with an alkali metal cation or by extraction with a relatively polar water immiscible solvent.

Our invention also provides a method of bittering beer which comprises: preparing a bittering additive comprising isohumulones substantially free from fixed oils, essential oils and lupulones and a kettle additive comprising lupulones and essential oils substantially free from fixed oil; converting the humulones in the bittering additive into isohumulones; adding the kettle additive to wort and subsequently adding the isomerised bittering additive.

According to the aspect our invention also provides a method of flavouring beer which comprises adding a potassium isohumulate salt to wort or fermented beer.

Our present invention, according to a further aspect, provides a method of preparing an improved bittering extract for beer which comprises contacting a solution of a humulone-containing hop material in a substantially water-immiscible solvent which dissolves alkali metal humulates less readily than water, with an aqueous alkali containing sodium ions at a pH sufficient to transfer the humulones into the aqueous phase as sodium humulates, separating the aqueous phase from the water immiscible phase and subsequently converting the sodium humulates to potassium humulates.

According to a further aspect our invention provides a method of preparing a bittering extract for beer which comprises contacting a solution of a hop extract in a water immiscible solvent which dissolves humulates less readily than water with aqueous potassium carbonate washing the aqueous solution with a water immiscible solvent that dissolves humulates less readily than water, and isomerising the potassium humulates.

According to a further aspect our invention provides a method of flavouring beer which comprises preparing a bittering extract comprising potassium isohumulates, and a copper adjunct comprising lupulones, or derivatives thereof, adding the copper adjunct to wort and at a subsequent stage in the brewing operation adding the bittering extract.

The humulone-containing hop material, which is dissolved in the water immiscible solvent in order to prepare the bittering extract according to our invention, is desirably an extract of hops containing humulones, lupulones and other resins, and oils. Such a material may conveniently be prepared by extracting hops with an organic solvent, e.g. hydrocarbons, alcohols, ketones such as acetone, and chlorinated hydrocarbon solvents. We have discovered that benzene, or preferably paraffins such as hexane are particularly suitable.

The humulone-containing hop material may alternatively comprise a partly purified extract, e.g. an extract from which fixed oils and/or waxes have been separated.

Preferably, the initial extraction of the hops is carried out on oast dried hops. However vine fresh or freeze dried hops may also be employed. Normally, the hops are ground in a high speed hammer mill and percolated with sufficient of the extracting solvent to remove at least a major part of the soluble components.

In order to carry out the contacting with aqueous sodium alkali, a solution of crude hop extract in the extracting solvent may be employed, providing the latter is water immiscible and dissolves alkali metal humulate salts less readily than does water. We have found that the best water immiscible solvents for use in the contacting step are non-polar hydrocarbons, e.g. petroleum ether is especially suitable. If desired, the original extracting solvent may be evaporated off and the crude extract dissolved in the water immiscible solvent of the contacting step. Alternatively, where a suitable solvent such as benzene or hexane is employed for the extraction, the initial solution of extract may be concentrated by evaporation of part of the extracting solvent, and the concentrated solution contacted with the aqueous sodium or potassium alkali, using for example, a counter-current extractor.

The aqueous alkali for use in the contacting step is preferably aqueous sodium or potassium carbonate (carbonates are particularly preferred since the bicarbonate is formed during the transfer of the humulones, and acts as a buffering agent). The alkali should be used in sufficient quantity to provide a final pH which will extract humulones or humulates but preferably not sufficient to extract the lupulones as lupulates. The preferred pH of the aqueous phase immediately prior to separation from the organic phase depends on the water-immiscible solvent selected. In the case of petroleum ether the pH may be in the range of 9 to 9.5, to give sufficient removal of the humulones but not of any substantial quantity of lupulones. Where benzene is used the pH may be up to 9.8. The alkali should be sufficiently dilute to avoid salting out the humulones by any bicarbonate formed during extraction. For example, a solution of less than 5% w/v carbonate and preferably less than 3% w/v carbonate is suitable, 2.5% to 2% w/v carbonate has been found to give especially good results. If desired, the partitioning may be carried out in two or more stages. For example in the first stage the pH of the final mixture may be 9 to 9.2. The aqueous phase will be separated and the organic phase contacted with portions of alkali at successively high pH. Each portion of alkali is contacted with successive portions of fresh organic solvent solution until the pH reaches the desired final level, and is then removed. Alternatively, the whole contacting operation may be performed in a single continuous counter-current extractor.

We have found that aqueous sodium carbonate gives a better separation of the desirable hop resins from worthless or undesirable hop ingredients than does potassium carbonate, but that high quality extracts may be obtained using aqueous potassium carbonate if the aqueous phase is washed with a non-polar water immiscible solvent such as petroleum ether, after separation from the non-aqueous phase.

A difficulty we have encountered when humulones are separated by the above technique, where the sodium or potassium humulates must be recovered from a dilute aqueous, system, is the considerable cost of evaporating the large volume of water to recover the extract. Moreover, the humulones are liable to deterioration upon prolonged heating. We have discovered that the humulones may be recovered from the aqueous solution by adding thereto the water soluble salt of a metal which forms a water insoluble humulate salt.

The salt used to precipitate the humulones may be any water soluble salt of a cation whose humulate salts are insoluble in the aqueous solution and whose carbonate is preferably insoluble in concentrated aqueous methanol, for example an alkaline earth metal, preferably calcium or magnesium. The anion is not important. For example, any water soluble chloride, bromide, iodide, sulphate, nitrate, acetate or similar salt of a metal such as calcium or magnesium may be employed. Other metals such as zinc, copper, strontium or nickel are operative, but are normally less preferred on account of their toxicity, which necessitates stringent precautions. Whether any particular salt is suitable can readily be determined by trial and error.

The precipitated humulate salt may be filtered, dissolved in a suitable organic solvent, e.g. methanol, and is preferably then converted to alkali metal humulate by adding a concentrated aqueous solution of an alkali metal carbonate, preferably potassium carbonate, whereupon an insoluble metal carbonate precipitates. The former precipitate, comprising insoluble humulate salts, is normally contacted while still wet with methanol (e.g. 97 to 100% methanol) sufficient to give at least 90% v/v methanol in the solution. The alkali metal carbonate is added in the form of a concentrated aqueous solution. The result is that after removal of the precipitated carbonate (e.g. by filtration) and the methanol (e.g. by evaporation), there is left a concentrated aqueous solution of the potassium humulated. Where the humulate has not already been isomerised, this solution, after any necessary adjustment of pH and concentration, may be boiled to isomerise the humulones. It is also possible to isomerise the humulones prior to the precipitation of the insoluble salt, in which case an isohumulate salt is precipitated.

As an alternative to the above described method of converting an insoluble metal humulate or isohumulate into an alkali metal humulate or isohumulate, it is also possible to employ a suitable cation exchange material (e.g. a cation exchange material of the type sold commercially as Zeo Karb 225), in order to remove the unwanted metal ions from the methanolic solution. The resulting solution may then be neutralised to pH 9 to 10.2, preferably with KOH. The methanol is recovered and the neutralised extract is boiled.

We have discovered that although either sodium or potassium carbonate may be used in the partitioning step, the isomerisation step is most effectively performed on the potassium humulate. We therefore prefer to contact a water immiscible solution of unisomerised hop material with aqueous sodium or potassium carbonate, separate the aqueous phase, recover the humulate salt from the aqueous phase, convert the humulate if necessary into a potassium humulate and subsequently isomerise the potassium humulate by boiling.

In order to avoid the filtration steps necessary when insoluble humulate salts are precipitated, we have devised an alternative method for separating the humulates or isohumulates from the aqueous solution. According to this alternative we prefer to contact the aqueous solution of alkali metal humulates or isohumulates, after separation from the water-immiscible solvent, with a volatile, polar, water-immiscible solvent, which is sufficiently polar to extract alkali metal humulates from the aqueous solution. The alkali metal humulates may be salted out by addition of a water soluble salt of the alkali metal e.g. where sodium carbonate has been used for the initial partition, NaCl may be employed to salt out the sodium humulates. The preferred water-immiscible polar solvents include relatively low boiling esters such as ethyl or isopropyl acetate, ketones such as methyl isobutyl ketone, and water-immiscible alcohols such as n-butanol.

If desired, the sodium humulates or isohumulates may be converted to potassium salts in solution. For example the solution in the polar solvent may be shaken with excess of aqueous mineral acid and washed with water to remove the acid and any residual alkali metal salt used in the salting out operation. The humulones so prepared may be converted to potassium humulates e.g. by addition of aqueous KOH sufficient to bring the pH to about 9. The potassium humulate may be isomerised, if necessary, by first boiling off the water immiscible solvent, adjusting the pH to about 10, and then boiling the remaining aqueous solution.

Humulones, separated from lupulones and essential oils in accordance with this specification may be isomerised by aqueous alkali. Preferably the pH is in the range 10.0 to 11 (e.g. 10.2). Temperatures above 90°C are preferred e.g. boiling point.

The isohumulate-containing extract is preferably added to beer as a bittering extract after fermentation.

The bittering extract typically contains a proportion of soft resins in addition to the isohumulate, but is preferably substantially free of the water insoluble or sparingly soluble resins such as the β-acids which tend to lower the solubility of the extract in beer and so inhibit the full utilization of the isohumulones. Desirably, the bittering extract is separated as much as is practicable from the hard resins and colouring matter.

We have discovered that when humulones have been separated from a water-immiscible solution by contacting with aqueous alkali and subsequently isomerised by heating in alkali, characteristic flavours, due to traces of unidentified material, sometimes arise during the isomerisation. These flavours may be unacceptable to some palates and we have discovered that that may be reduced by contacting the aqueous isomerised extract with a water-immiscible, relatively non-polar solvent, such as benzene or, preferably, petroleum ether.

Preferably the solution of isohumulates is evaporated to leave a soft extract containing, for example 10 – 25% water. This extract may conveniently be dissolved in water prior to addition to wort or beer.

Where a copper adjunct is employed, it preferably comprises lupulones, and/or hulupones. Preferably the copper adjunct also comprises at least part of the less steam volatile portion of the essential oils. The copper adjunct normally contains other soft resins together with some hard resins, but is desirably free of fixed oil, hop waxes and methanol insoluble materials.

Hop ingredients remaining in the water-immiscible solvent used in the initial contacting step or steps, may be recovered from the water-immiscible solvent after separation from the aqueous phase and freed from any fixed oil and hop waxes by redissolving in aqueous methanol as described in our application Ser. No. 629,905. The purified materials may comprise lupulones and essential oils, together with soft and hard resins, and may be added to the wort. The wort should then be boiled, thereby removing the more volatile fractions of the essential oils leaving only the traces of the less volatile fractions normally present in beer. Alternatively, the mixture comprising lupulones and essential oils may be refined, e.g. by steam-distillation distillation prior to addition to the wort or beer. The lupulone-containing adjunct should be added in any case prior to the isohumulone-containing adjunct.

If desired, the copper adjunct may comprise, or be used in conjunction with, other hop ingredients such as the water soluble materials which are normally present in hops e.g. tannins and soluble proteins. The adjuncts according to our invention may be used in conjunction with ordinary hops.

Any fixed oil may, if desired, be removed from the initial extract prior to the step of dissolving in the water-immiscible solvent used in the initial contacting with aqueous alkali. For example, the initial extract may be dissolved in 80 to 95% aqueous methanol as described in the aforesaid application Ser. No. 629,905. If desired, the lupulones from the hops may be converted to hulupones by appropriate chemical treatment, e.g. alkaline oxidation.

The invention will now be described in more detail in the following examples:

EXAMPLE 1

1000 ml of a solution containing 5% sodium isohumulates in distilled water, was extracted with 3 × 200 ml portions of n-butanol and the isohumulate free aqueous solution was discarded. The n-butanol extractions were combined and thoroughly washed with sufficient N HCl solution (150 – 200 ml.) to give a pH of 1.0 in the acid layer.

After rejecting the acid liquor, the n-butanol phase was re-equilibrated with 5% w/v KOH solution (approximately 300 to 350 ml) until a pH of 10.5 was reached in the alkaline phase.

The alkaline solution was separated and back extracted with a further 100 ml of fresh n-butanol to recover entrained potassium isohumulates into the n-butanol layer.

The n-butanol solutions were mixed together and the solvent recovered by vacuum distillation; sufficient water was added towards the end of the recovery process to azeotrope with the remaining traces of n-butanol and give a final isomerised hop extract containing about 20% water and 50% potassium isohumulates. The product was superior to the sodium isohumulate as a bittering agent for beer.

EXAMPLE 2

Ground dried hops were extracted with light petroleum ether (B.P.75° to 95°C) at a temperature of 30°C. Most of the solvent was removed from the extract by distillation and a concentrate containing approximately 20% weight of volume total solids in the petroleum ether was carried forward to the next stage. This solution was agitated vigorously with a dilute solution (2.5% w/v) of potassium carbonate in water, the addition of this latter solution being continued gradually until the pH of the aqueous phase reached 9.0 to 9.2. The mixture was allowed to settle and the aqueous layer run off and reserved. The petroleum ether solution was then agitated with further potassium carbonate solution, progressively added until the pH reached a value of 10.0 to 10.2, the mixture was allowed to settle, and the lower layer was then run off. This secondary solution contained a small quantity of the desired humulones, not removed by the first treatment, but in addition it contained some lupulones. It was used as the first part of the solution required to extract the humulones from a further quantity of petroleum ether solution of hop extract, when the lupulones were removed from it by the petroleum ether; further potassium carbonate solution was then gradually added to raise the pH value to 9.0 to 9.1. The initial aqueous solution (pH 9.0 to 9.2) from the first and subsequent batches of hop extract was washed with clean petroleum ether, to remove any remaining unwanted material, and then treated with a 50% w/v aqueous solution of calcium chloride in distinct excess, to precipitate the calcium salts of the desired hop acids. The calcium salts of the humulones were collected by vacuum filtration or by means of a centrifuge, and, while still moist, were dissolved in methyl alcohol. The insoluble solid, consisting of calcium carbonate and bicarbonate was not removed at this stage. Potassium carbonate (50% w/v in water) was added to the mathanolic solution until a pH value of 12.0 to 12.2 was obtained; this caused the complete precipitation of the calcium ions in the form of calcium carbonate and/or bicarbonate, the humulones being converted to their soluble potassium salts. The insoluble calcium carbonate and bicarbonate were removed by filtration, the filtrate was adjusted to pH 9.8 to 10.2 with citric acid and the methanol removed from it by distillation under partial vacuum. The residual aqueous solution of the potassium salts of the humulones was diluted with more water to produce a tractable solution containing 30% w/v total solids, boiled for approximately 45 minutes to effect isomerisation, then concentrated by vacuum distillation to a soft extract, containing 10 to 20% of water. The soft extract could be dried under vacuum to a dry product which could be powdered. Products obtained in accordance with the above procedure contained from 40 to 60% of isohumulones, and were suitable for addition to unhopped or lightly hopped beer after fermentation.

The petroleum ether solution from which the humulones had been extracted, was subjected to distillation to recover the solvent. The resultant extract which contained lupulones and other hop resins, and hop essential oil, in addition to undesirable hop seed oil and other constituents, was then purified with 85% aqueous methyl alcohol as described in said Pat. No. 3,607,298 and was found suitable for use as a "kettle additive" in the production of beer enabling desirable constituents, including the essential oil of hop and lupulones to be utilized to the best advantage.

EXAMPLE 3

Hop extract (150 lb.) obtained by extracting dried hops with benzene and containing 27.4% humulones (by conductimetry); was dissolved in Petroleum ether (B.P. 75°–95°C; 50 gallons). The insoluble matter was discarded and the solution divided into three equal parts by volume (22 gallons each). Each portion was extracted with 2% w/v aqueous sodium carbonate solution at 40°C in counter current fashion to pH 9.0–9.1 as indicated in the following table:

|  | Petrol Solution 1 | Petrol Solution 2 | Petrol Solution 3 |
|---|---|---|---|
| 1st. Extraction | Add 40 gallons alkali (pH 9.15) ↓ Organic Phase ↓ | Add aqueous phase from 2nd. extraction of Solution 1 + 5 gallons alkali (pH 9.05) ↓ Organic Phase ↓ | Add aqueous phase from 2nd extraction of Solution 2 + 5 gallons alkali (pH 9.05) ↓ Organic Phase ↓ |
| 2nd. Extraction | Add 40 gallons alkali (pH 10.3) ↓ Organic Phase ↓ | Add aqueous phase from 3rd. extraction of Solution 1 (pH 10.15) ↓ Organic Phase ↓ | Add aqueous phase from 3rd. extraction of Solution 2 (pH 10.2) |
| 3rd. Extraction | Add 40 gallons alkali (pH 10.5) | Add 40 gallons alkali (pH 10.4) | |

The three aqueous solutions at pH 9.15 and 9.05 were bulked and washed with petroleum ether (B.P. 75°–95°C; 50 gallons).

The resultant washed aqueous solution (total volume 130 gallons) was treated with a saturated aqueous solution of sodium chloride (15 gallons) and extracted with three portions of ethyl acetate (each of 15 gallons). The resultant ethyl acetate solutions were combined and trained with 10% w/v aqueous hydrochloric acid (10 gallons). After thorough agitation the mixture was allowed to separate and the lower aqueous phase run off and discarded. The ethyl acetate solution was treated with 10% w/v aqueous potassium hydroxide (q.s.). by gradual addition with stirring until the pH of the aqueous phase reached 9.0. The lower aqueous layer was run off and reserved. The solvent was removed from the ethyl acetate solution by distillation and the reserved aqueous layer added to the residue. The pH of the aqueous solution was adjusted to a value of 10.0 by the addition of 25% w/v aqueous potassium carbonate (q.s.) and the mixture boiled at atmospheric pressure for 90 minutes, to achieve isomerisation.

The isomerised solution was then evaporated under vacuum, to give the required product (62.1 lb.), as a soft extract containing 48.8% isohumulones (by counter current analysis) and and 20% residual water.

Therefore, the conversion recovery of isohumulones from the starting material was 73.6% of theory.

We claim:

1. A method for the flavouring of beer which comprises adding to fermented beer a hop extract, the said hop extract being an aqueous solution consisting essentialy of water and between about 40% and 60% by weight of potassium isohumulates substantially free from lupulones and fixed and essential oils of hops.

2. A flavouring agent suitable for addition to fermented beer, said flavouring agent being an aqueous solution consisting essentially of water and between about 40% and 60% by weight of potassium isohumulates substantially free from lupulones and fixed and essential oils of hops.

3. The flavouring agent of claim 2, containing about 48.8% by weight of potassium isohumulates.

4. The flavouring agent of claim 2, containing about 50% by weight of potassium isohumulates.

* * * * *